3,529,049
METHOD OF MAKING A MICROPOROUS
SHEET MATERIAL HAVING AN AIR-
PERMEABLE COATING
Jerrold J. Abell, Manchester, and Bruce G. Kosa, Willington, Conn., assignors to Rogers Corporation, Rogers, Conn., a corporation of Massachusetts
No Drawing. Filed Oct. 25, 1966, Ser. No. 589,230
Int. Cl. B29c *13/00;* B32b *31/04*
U.S. Cl. 264—112                         7 Claims

ABSTRACT OF THE DISCLOSURE

A method of forming a microporous sheet of resin having an air-permeable coating is presented. The coating is initially an air impermeable film, and the coating is rendered air permeable during the process of being fused to the microporous sheet of resin.

---

The present invention relates to microporous sheets of resin and more particularly to such sheets having an air-permeable coating.

Microporous sheets of resin which resist the passage of water and other liquids but which are permeable to air and water vapor so that they may be said to "breathe" are well known in the art. The materials are particularly adapted for the manufacture of rainwear and footwear, and a particularly suitable product of this type is that manufactured in accordance with the process described in Yarrison Pat. No. 3,067,469, which issued on Dec. 11, 1962.

These products are, however, subject to certain disadvantages, and it is the object of the present invention to provide a microporous sheet with a firmly bonded thin film or coating which is itself permeable to air and vapors so as not to destroy the breathing property of the final product, but which film is useful in providing color, increasing cleanability, curtailing plasticizer migration, modifying the hand of the microporous substrate and in certain instances, improving the abrasion resistance of the substrate.

In its broadest aspect, the present invention comprises an air- and vapor-permeable microporous sheet of resin, which itself forms no part of the invention and may be self-sustaining or laminated to an air-permeable fibrous backing sheet, which microporous sheet has at least one surface thereof provided with a firmly bonded thin film or coating of resin having a weight of 0.1 to 2.0 gm./ft.$^2$.

As pointed out in the aforementioned Yarrison patent, the microporous sheet may be formed from a wide variety of thermoplastic resins. They include vinyl resins, polyethylene, natural rubber and/or the various synthetic rubbers, the various acrylic resins and other water-insoluble thermoplastic resins, both natural and synthetic, which either are flexible by nature or which can be flexibilized with suitable agents. These materials may be blended with each other and/or compounded with fillers, plasticizers, pigments or dyes, and the like according to well-known compounding techniques to provide suitable resilient compositions. Several of the materials, e.g. the vinyl chloride polymers, are obtainable in the form of fine particles suitable for sintering. A resin compound available in granular form and suitable for the production of a microporous sintered sheet material comprises 66.53 parts by weight of a copolymer of vinyl chloride and vinyl acetate in the ratio of 95:5, 32.25 parts by weight of a nonvolatile plasticizer, 0.64 part by weight of a coloring agent and filler, 0.22 part by weight of a commercial wetting agent (e.g. "Tween 20") and 0.36 part by weight of bis-phenol epichlorhydrine condensate. The condensate acts as a heat stabilizer for the copolymer and the wetting agent is believed to aid movement of moisture-laden vapor through the microporous sintered sheet. Where the resins are not available in this form, it is possible to subdivide masses of them to provide the desired particles. Product requirements dictate the size of particles to be sintered together. Using the plasticized granular resin compound described above, particles which are of a size to pass through a 30 mesh screen are preferred.

The nature of the resin which may be used for the thin film or coating may also be widely varied. It may even be a thermosetting resin, but it is to be understood that if this is the case, the resin is in an intermediate fusible stage at the time of application to the microporous sheet. Thus, the thin film or coating may comprise resin such as a thermoplastic acrylic ester polymer, a thermoplastic polyester, a thermoplastic polyurethane, polyvinyl chloride, polyvinyl acetate, copolymers of vinyl chloride and vinyl acetate, polyvinylidene chloride, natural and synthetic elastomers and phenol-formaldehyde resins.

Particularly suitable resins for use in the practice of the invention are thermoplastic acrylic ester polymers, such as Acryloid AT–51 manufactured by Rohm and Haas Company, thermoplastic polyesters, such as Vitel PE–200 and Vitel PE–207 manufactured by the Goodyear Tire and Rubber Company, and thermoplastic polyurethanes, such as Estane 5701 manufactured by B. F. Goodrich Chemical Co. The first two of these resins are particularly hard and glossy and provide the porous substrate with a very hard and smooth surface, while the third resin is very flexible and tough. All of the resins provide films which may be cleaned easily by wiping with a damp cloth and the second of the resins provides a coating which makes the product particularly abrasion resistant. In fact, a product made by using the second resin, after 500 cycles of testing on a Taber abraser with a CS–17 wheel, showed a weight loss of only eight milligrams.

The products of the invention are made by first forming a thin film of the desired resin having a weight of 0.1 to 2.0 gm./ft.$^2$ on a backing sheet provided with a release coating such as a silicone resin, to which the thin film temporarily and releasably adheres. The thin film is formed by applying a solution of the resin in a volatile organic solvent or an emulsified dispersion of it in water to the backing sheet by a doctor knife, wire wound rod, a roller coater or any other suitable means. The coating is dried at room temperature or at some elevated temperature below the fusion point of the resin used as the coating, and the concentration of the resin solution or dispersion and the amount of it applied can readily be adjusted to provide a film of the desired weight.

The thin film after being coated onto the temporary backing sheet should be essentially free of pin holes or other discontinuities. Such discontinuities in the film are not necessary to obtain a porous coating and, if present in excessive number, degrade the appearance of the surface of the coated sheet. Permeability is obtained due to the formation of holes in the thin film as it is laminated to the microporous sheet. These holes form in unsupported areas of the film directly over the pores in the microporous sheet and are substantially smaller than the pores but may be observed at 30× or greater under a microscope.

For purposes of illustration, the following examples are given of particularly suitable compositions for forming the thin film on the temporary backing sheet.

EXAMPLE 1

Parts by wt.
Acryloid AT–51 _____ 100
Methyl ethyl ketone _____ 233

EXAMPLE 2

| | |
|---|---:|
| Vitel PE–200 | 75 |
| Vitel PE–207 | 25 |
| Pigment | 3.3 |
| Methyl ethyl ketone | 666 |

EXAMPLE 3

| | |
|---|---:|
| Estane 5701 | 100 |
| Tetrahydrofuran | 734 |
| Pigment | 10 |

After forming the thin film of resin on the temporary backing sheet, it is applied to the microporous sheet of resin by pressing it against a surface thereof while the microporous sheet is at a temperature which will cause the thin film to fuse to it, but which is below that which will materially affect its porosity. After cooling the resultant assembly, the temporary backing sheet is easily stripped away because of the presence of the release coating thereon, and the thin film is then permanently secured by fusion to the microporous sheet.

The microporous sheet to which the thin film is attached in this manner may be a preformed one, which has been heated to a temperature which will cause the thin film to fuse to it, but it is preferred that the application of the thin film be accomplished concomitantly with the manufacture of the microporous resin sheet.

The method described by Yarrison Pat. No. 3,067,469 is particularly adaptable to the manufacture of the products of the present invention. In accordance with the disclosure of this patent, a thermoplastic resin in fine granular form is spread as a uniform layer on a resiliently compressible, fibrous sheet. A second resiliently compressible, fibrous sheet is then laid down on the exposed surface of the resin layer, and the resultant assembly is passed between heated plates forming a converging passageway, the entry to which has a thickness approximating the thickness of the assembly and the exit from which has a thickness less than the original thickness of the assembly. The heated plates compact the granules of the resin layer and sinter them together to form a microporous sheet of resin.

During the carrying out of the method just described, it is a simple matter to apply the thin film or coating of resin to one or both surfaces of the microporous sheet of resin as it is being formed. This is preferably accomplished by forming, as described above, a thin releasable resin film having a weight of from 0.1 to 2.0 gm./ft.² on one or both of the first and second compressible fibrous sheets prior to using them in the process. Then when the assembly is passed between the converging metal plates, the heat and pressure not only compacts and sinters the fine granular resin layer, but also fuses the thin releasable resin film to the compacted and sintered product. After cooling, the compressible fibrous sheet is readily stripped from the thin resin film leaving it permanently bonded to the microporous sheet of resin. If only one of the compressible fibrous sheets is provided with a thin releasable film of resin, the other fibrous sheet can be stripped from the microporous sheet or it can be left bonded thereto. If the final product is to have a fibrous backing sheet, an adhesive is ordinarily interposed between the fibrous carrier sheet and the granular resin layer to improve the bond between the fibrous sheet and the microporous sheet in the final product.

Rather than to employ one of the compressible fibrous sheets as a temporary backing sheet for the thin resin film, there may be used a separate cover sheet coated with a releasable thin layer of resin. This cover sheet may comprise a conventional silicone release paper and it is inserted between the compressible fibrous sheet and the powdered resin layer prior to the entrance of the assembly into the passageway between the heated plates.

By the process described above, there is produced a coated microporous sheet of resin having the advantageous properties mentioned earlier, and permeability measurements have shown air flows and water vapor transmission characteristics equivalent to those obtained with an uncoated microporous sheet.

Having thus described the invention, what is claimed is:

1. The method of manufacturing a microporous sheet of resin having an air-permeable coating which comprises applying a solution or dispersion of a resin in a liquid to a temporary backing sheet having a release surface; evaporating said liquid to provide on said release surface a thin air impermeable layer of resin having a weight of from 0.1 to 2.0 gm./ft.²; placing said thin layer of resin backed by said backing sheet in contact with a heated microporous sheet of resin and applying pressure to said backing sheet to cause said thin layer of resin to fuse to said microporous sheet and become air permeable; and after cooling, stripping said backing sheet from said thin layer of resin fused to said microporous sheet.

2. The method of manufacturing a microporous sheet of resin having an air-permeable coating which comprises the steps of spreading fine granular, thermoplastic resin in a uniform layer on a first resiliently compressible, fibrous sheet; placing over the exposed surface of said layer of second resiliently compressible, fibrous sheet; interposing between at least one of said fibrous sheets and said layer of granular thermoplastic resin a supported releasable thin air impermeable film of resin having a weight of from 0.1 to 2.0 gm./ft.²; passing the resultant assembly between heated plates defining a passageway varying in thickness from a thickness at the entry of the passageway approximating the initial thickness of said assembly to a thickness less than the initial thickness at the exit of said passageway, said heated plates supplying heat and pressure to portions of said assembly passing therethrough to sinter the resin granules together into a microporous layer and to cause said releasable thin film of resin to fuse to said microporous layer and become air permeable; and after cooling, stripping said thin film of resin now fused to said microporous layer from its support.

3. The process of claim 2 in which said thin film of resin is releasably secured to one of said first and second compressible fibrous sheets.

4. The process of claim 2 in which said thin film of resin is releasably secured to a separate supporting sheet interposed between one of said first and second compressible fibrous sheets and said layer of granular thermoplastic resin.

5. The process of claim 2 in which said thin film of resin is composed of an acrylic ester polymer.

6. The process of claim 2 in which said film of resin is composed of a thermoplastic polyester resin.

7. The process of claim 2 in which said thin film of resin is composed of a thermoplastic polyurethane resin.

References Cited

UNITED STATES PATENTS

| | | | |
|---|---|---|---|
| 3,258,513 | 6/1966 | Berry et al. | 264—112 |
| 3,401,070 | 9/1968 | Brown | 156—230 |
| 3,405,206 | 10/1968 | Abell et al. | 264—112 |

JOHN T. GOOLKASIAN, Primary Examiner

W. E. HOAG, Assistan Examiner

U.S. Cl. X.R.

117—98; 156—77, 230, 242, 247; 161—112, 146